United States Patent [19]

Kurihara et al.

[11] 4,383,328

[45] May 10, 1983

[54] X-RAY STEREOSCOPIC CINEMATOGRAPHY APPARATUS

[75] Inventors: Tetsurou Kurihara; Kohsaku Nishio, both of Ootawara, Japan

[73] Assignee: Tokyo Shibaura Denki Kabushiki Kaisha, Kasasaki, Japan

[21] Appl. No.: 322,287

[22] Filed: Nov. 17, 1981

[30] Foreign Application Priority Data

Nov. 20, 1980 [JP] Japan ............................. 55-163934

[51] Int. Cl.³ .............................................. A61B 6/02
[52] U.S. Cl. ........................................ 378/042; 378/92
[58] Field of Search .................. 378/41, 42, 171, 176, 378/92

[56] References Cited

U.S. PATENT DOCUMENTS 3,424,901 1/1969 Kok ....................................... 378/92
3,432,658 3/1969 Quinn ..................................... 378/41

OTHER PUBLICATIONS

Lindblom, K., "Roentgen Television in Surgery with Special Reference to Stereo-Television", *Acta. Radiol.*, 53 (1960), pp. 367-370.

*Primary Examiner*—Alfred E. Smith
*Assistant Examiner*—T. N. Grigsby

*Attorney, Agent, or Firm*—Finnegan, Henderson, Farabow, Garrett & Dunner

[57] ABSTRACT

An X-ray stereoscopic cinematography apparatus including an X-ray tube having at least a pair of focal spots from which X-rays are irradiated independently at an object under study to produce an X-ray image thereof, an image intensifier for converting the X-ray image to a corresponding optical image, and an optical system device for selectively distributing the optical image to first and second cinecameras. The optical system device includes a first half-mirror having a reflection rate of approximately fifty percent, a second half-mirror having a comparatively low transmission rate and an entire reflection mirror, the half-mirrors and the entire reflection mirror being separately positionable in a first position to reflect the optical image or a second position out of the light path of the optical image to distribute the optical image to the first and second cinecameras. A reflector located in the optical field of the image intensifier reflects the image to a television camera provided to accept the optical image delivered through the optical system device and to convert it to an electric signal. A mode setter enables the selection of one of a stereoscopic cinematography mode, a single cinematography mode, and a fluoroscopy mode.

4 Claims, 8 Drawing Figures

X-RAY STEREOSCOPIC CINEMATOGRAPHY APPARATUS

FIELD OF THE INVENTION

This invention relates to an X-ray stereoscopic cinematography apparatus, and more particularly to an X-ray stereoscopic cinematography apparatus having functions to carry out single source X-ray cinematography and X-ray fluoroscopy.

BACKGROUND OF THE INVENTION

In the field of X-ray examination there is oftentimes a great need to view an object such as an organ of a patient as a three-dimensional image. Such need is particularly acute in angiography. In the past, only single direction radiography has been available as an examination tool in the treatment of congenital heart disease, valvular heart disease, hepatic artery disease, or the like. In the treatment of all of these diseases cardiovascular angiography is employed. However, three-dimensional organs and tissues can be observed only in a single plane when single direction radiography is used. It is extremely difficult to view a single direction radiographic image as a stereoscopic image.

Dual direction radiography has been used in the past to observe the cardiovascular system. Since the two resultant images, however, are both individual planar images differing only in radiographic direction, stereo-viewing of dual direction radiographic images has not proved satisfactory.

Also, in cardiovascular angiography, X-ray fluoroscopy has been performed by injecting a contrast medium and then filming fluoroscopic images with a cinecamera. Since conventional fluoroscopy systems are constructed to use one individual X-ray tube and one individual cinecamera for each direction of radiography, the resultant images in each direction are merely individual planar images even when two-directional radiography is employed. Because of the shortcomings of radiographic and fluoroscopic systems, it is difficult to observe the cardiovascular system precisely in a three-dimensional manner.

SUMMARY OF THE INVENTION

It is therefore an object of this invention to provide an X-ray stereoscopic cinematography apparatus to enable the viewing of three-dimensional X-ray cinematography images of an object.

It is a further object of this invention to provide an X-ray stereoscopic cinematography apparatus capable of performing single X-ray cinematography.

It is yet another object of this invention to provide an X-ray stereoscopic cinematography apparatus capable of performing X-ray fluoroscopy.

It is yet a further object of this invention to provide an X-ray stereoscopic cinematography apparatus capable of performing both single X-ray cinematography and X-ray fluoroscopy.

Briefly, these and other objects are achieved in accordance with a first aspect of the invention by an X-ray cinematography apparatus capable of displaying an object in any of a stereoscopic X-ray cinematography, a single X-ray cinematography, and a fluoroscopy mode, comprising an X-ray tube havig at least a pair of focal spots from which X-ray beams are independently irradiated to scan an object under observation and to produce an X-ray image thereof, means for converting the X-ray image to a corresponding optical image, a first cinecamera, a second cinecamera, an optical image distributor for selectively distributing the optical image between the first cinecamera and the second cinecamera, the optical image distributor including a first half-mirror having a reflection rate of substantially fifty percent and being positionable in a first position to reflect a portion of the intensity of the optical image to the first cinecamera and to transmit a portion of the intensity of the optical image to the second cinecamera and a second position removed from the path of the optical image and a second half-mirror having a comparatively low transmission rate and being positionable in a first position to reflect a portion of the intensity of the optical image to the first cinecamera, a second position to reflect a portion of the optical intensity to the second cinecamera, and a third position removed from the path of the optical image, and an entire reflection mirror positionable in a first position in the optical path of the optical image to reflect the image and a second position removed from the optical path of the optical image, a televsion camera for receiving the optical image and for converting the received optical image to corresponding electric signals, a mode setter for selecting one of a stereoscopic cinematography mode, a single cinematography mode, and a fluoroscopy mode, a radiographic control device for positioning the second half-mirror into and out of the first, second, and third positions, and for positioning the first half-mirror and the entire reflection mirror into and out of the first and second positions in accordance with the selected mode, for controlling the intensity of the optical image reflected to the second cinecamera and the television camera responsive to the positioning of the first and second half-mirrors and the entire reflection mirror, for controlling photography of the optical image by the first and second cinecameras, and for issuing X-ray exposure switching signals synchronized to the positions of the shutters of the first and second cinecameras in accordance with shutter position signals, a controller responsive to the mode selected by the mode setter for controlling the radiographic control device to position (1) the first half-mirror in the first position, the second half-mirror into the third position, and the entire reflection mirror into the second position responsive to the selection of the stereoscopic cinematography mode, (2) the first half-mirror in the second position the second half-mirror into the second position and the entire reflection mirror into the first position responsive to the selection of the single cinematography mode, and (3) the first half-mirror in the second position, the second half-mirror in the third position and the entire reflection mirror into the first position in response to the selection of the fluoroscopy mode, and an X-ray switch controller for performing on-off control for X-rays irradiated from the focal spots of the X-ray tube.

Preferably, the radiographic control device controls the degree of opening of diaphragms associated with the second cinecamera and the television camera according to changes in the intensity of light incident thereon due to the positioning of the first and second half-mirrors into the first and second positions.

DESCRIPTION OF THE PREFERRED EMBODIMENT

Figure 1:
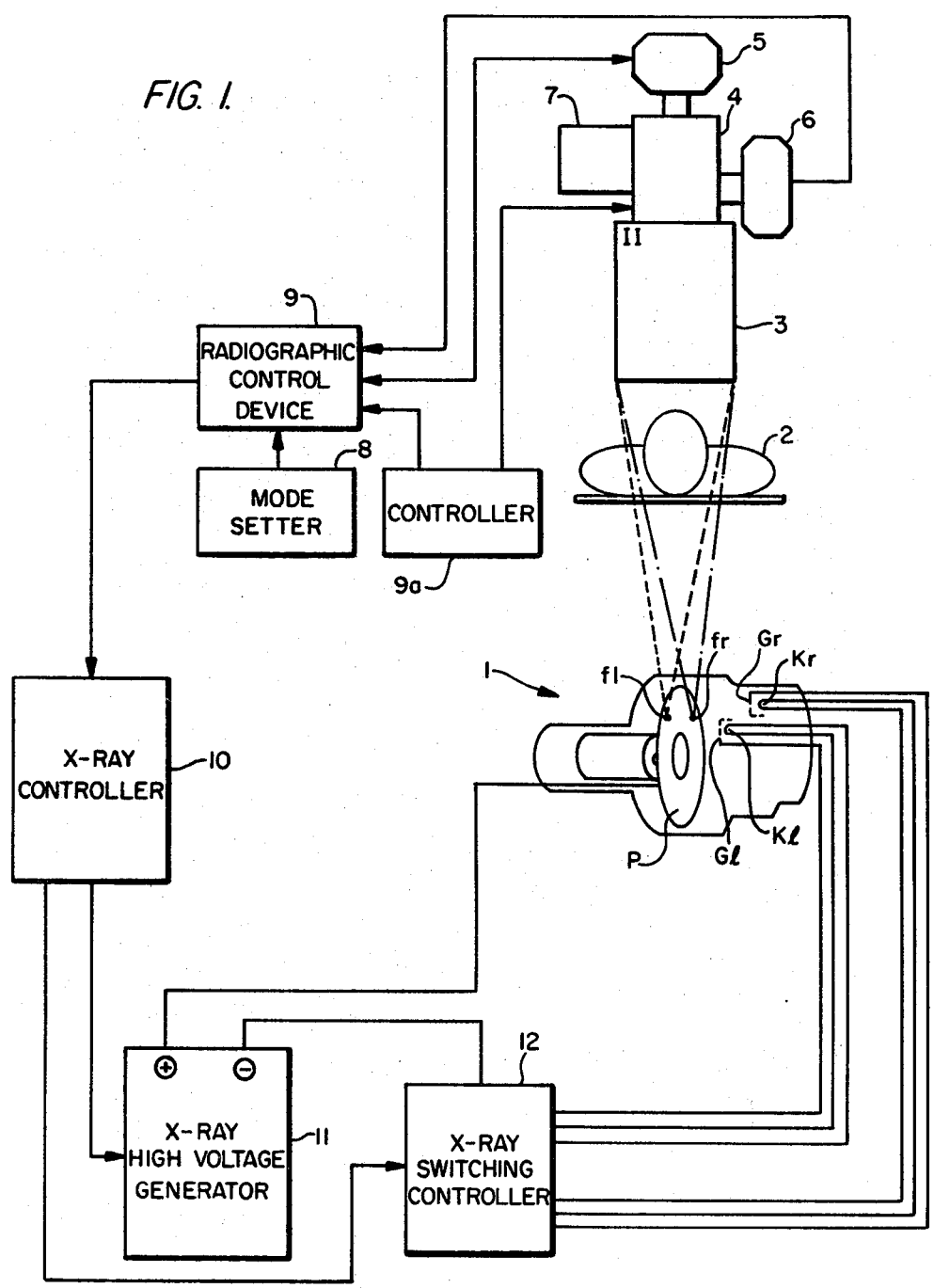
FIG. 1 is a schematic block diagram illustrating an embodiment of this invention.

Referring now to FIG. 1, an X-ray tube 1 for stereoscopic radiography has a conic, trapezoidal-shaped rotating anode P, and two cathodes Kr and Kl spaced apart from one another by a distance corresponding to the average distance between a person's pupils and facing the oblique part of anode P. The suffixes r and l to the reference numerals are used herein to refer to the right and left eyes, respectively.

A pair of grids Gr and Gl are interposed between the cathodes Kr and Kl and the rotating anode P for X-ray exposure control. The grids Gr and Gl are electrically conductive and the potentials applied to the grids Gr and Gl are cyclically alternated to permit X-rays to be emitted from a pair of focal spots fr and fl on the anode P of the X-ray tube 1. Heat electrons are alternately emitted from the cathodes Kr and Kl for the right and left eyes. The heat electrons impinge upon the oblique plane of the anode P at the focal spots fr and fl to cause a pair of X-ray beams to be radiated. Thus, the resultant pair of X-ray beams are spaced apart by a distance equal to the average distance between the pupils of the eyes and are alternately generated. A pair of examples of the above-described X-ray tube 1 is taught, for example, in U.S. Pat. No. 4,287,420.

An object 2 to be studied, such as a patient, is positioned between the X-ray tube 1 and an image intensifier 3. The image intensifier 3 accepts on its input face the X-ray beams emanating from the X-ray tube 1 after passing through the object 2. The X-ray beams passing through the object 2 form an X-ray image thereof. The intensifier 3 converts the X-ray image to a corresponding optical image. An optical system device 4 positioned at the output of the intensifier 3 distributes the optical image produced by the intensifier 3.

Cinecameras 5 and 6 are attached to the optical system 4 to photograph the optical images distributed and directed thereto through the optical system 4 from the output of the intensifier 3. The cinecameras 5, 6 are driven so as not to superimpose their shutter open times. That is, each of the cinecameras 5 and 6 includes a shutter (not shown) which, for example, comprises a rotating disc having a window in a portion thereof. The speed of movement the film is coordinated with the rotation rate of the shutter so that a single image per film frame is photographed through the window for each rotation of the shutter.

The shutters of the cinecameras 5 and 6 are rotated 180° out of phase so that images are alternately photographed by the cinecameras 5 and 6 to perform stereoscopic radiography. An example of a suitable cinecamera is the ARRITECHNO 35 manufactured by Arnold & Richter KG.

The cinecameras 5 and 6 also include detectors (not shown) for issuing shutter position signals indicating whether the shutter is in a first position, for example open, or a second position, for example closed. The shutter position signals are supplied to a radiographic control device as explained below.

A television camera for an X-ray television system converts the optical image from the intensifier 3 to a corresponding electric image signal and then delivers the resultant electric image signal to a television monitor (not shown).

Figure 2B:
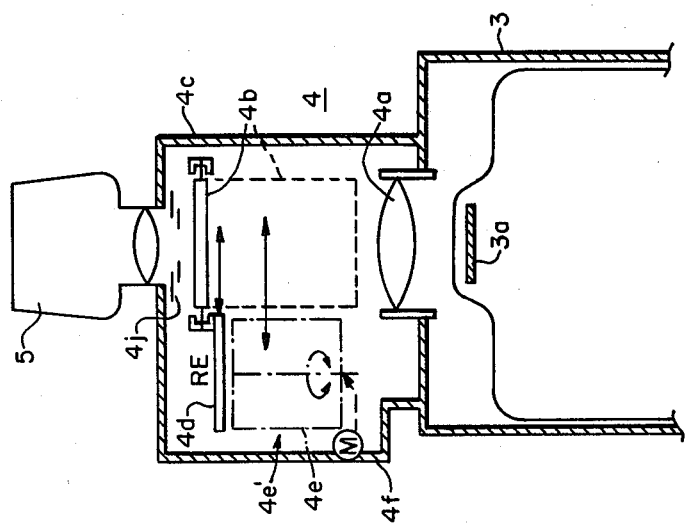
FIG. 2(b) is a sectional view of the optical system device shown in FIG. 2(a) taken along the lines A—A.
Figure 2A:
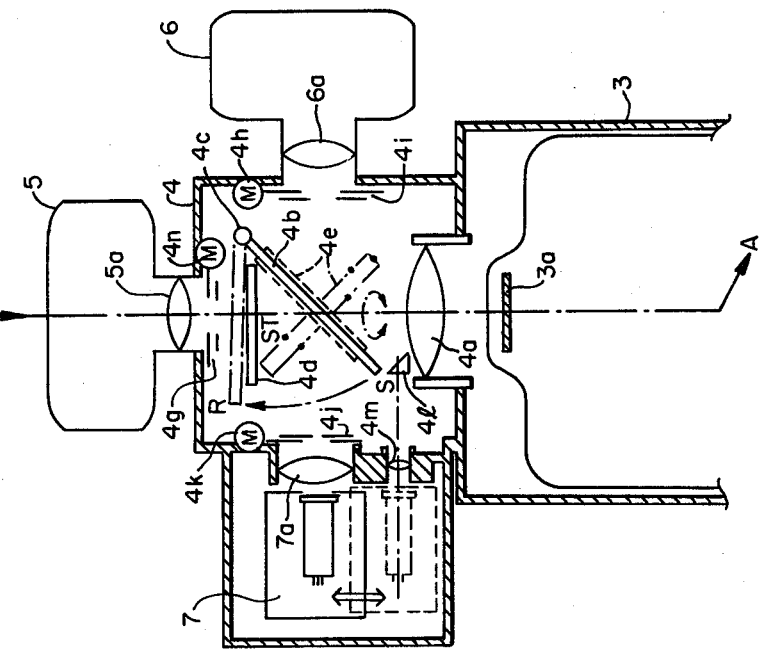
FIG. 2(a) is a sectional view of the optical system device of this invention.

In FIG. 2(a), the optical system 4 and the optical system peripherals are shown in detail. The cinecamera 5 is attached to the optical system 4 so that the optical axis of the cinecamera 5 coincides with the optical axis of the lens 4a provided adjacent to the output face 3a of the intensifier 3. The cinecamera 5 includes a lens 5a.

The cinecamera 6 and the television camera 7 are attached to opposite sides of the optical system 4. The optical axes of the cinecamera 6 and television camera 7 intersect the optical axis of the lens 4a at an angle of 90°.

Also, in the optical system device 4, a half mirror 4b is provided in the path of the optical field of the lens 4a and is aligned with the optical axes of the cinecameras 5, 6 for distributing to the cinecameras 5, 6 the optical images outputted by the intensifier 3 through the lens 4a. This half-mirror 4b has a reflection rate of 50% and a transmission rate of 50%. Also, the half-mirror 4b is mounted on hinge 4c for movement in a "jump-up" manner into and out of the optical path between the lens 4a associated with the image intensifier 3 and the lens 5a of the cinecamera 5 by a suitable drive mechanism (not shown).

When moved into the optical path between the lens 4a and the lens 5a, the half-mirror 4b distributes the image outputted by the intensifier 3 to the cinecameras 5 and 6. Hereinafter, this position will be designated as a setting position S. When the half-mirror 4b is moved out of the optical path between the lens 4a and the lens 5a a shunting position R is assumed by the half-mirror 4b. The half-mirror 4b is positioned into the shunting position R during the single direction cinematography and fluoroscopy modes of operation.

An entire reflection mirror 4d is movable between a side shunting position RE (FIG. 2b) and a position ST in front of the half-mirror 4b is in the shunting position R. The optical axis of the reflection mirror 4d is aligned with the optical axis of the lens 4a. The entire reflection mirror 4d is usually in the shunting position RE and out of the optical path of the lens 4a. When moved into the optical field of the lens 4a, the entire reflection mirror 4d is in a position ST as shown in FIG. 2(a). The positioning of the mirror 4d is performed by a suitable drive mechanism (not shown).

A mirror unit 4e' (FIG. 2(b)), which includes a half-mirror 4e having an inclination of 45° with respect to the optical axis of the lens 4a, a reflection rate of 90%, and a transmission rate of 10% is provided as shown in FIG. 2(b). The mirror unit 4e' is usually in a shunting position, i.e., out of the optical field of the lens 4a, and is movable into an interposing position, i.e., into the optical field of the lens 4a, whenever the fluoroscopy or the single cinematography operation mode has been selected. The mirror unit 4e' is positionable independently of the entire reflection mirror 4d and is movable between the shunting position and the interposing position by a suitable drive mechanism (not shown).

The mirror unit 4e' is constructed so that the half-mirror 4e is rotatable around its optical axis by a motor 4f. This enables the light reflected from the half-mirror 4e to be delivered to the cinecamera 6 or the television camera 7 in response to its rotating position.

An optical diaphragm 4i is coupled to a diaphragm closing motor 4h to control the quantity of light incident upon the lens 6a of the cinecamera 6. When the half-mirror 4b is in the shunt position R and the half-mirror 4e is in the optical field of lens 4a, the shutterr 4i will be opened by motor 4h to enable more light to pass to the cinecamera 6 to maintain the level of incident light in the optimum range.

When the half-mirror 4e is in the shunt position R and the half-mirror 4b is moved into position ST, the optical diaphragm 4i will be closed appropriately by the motor 4h to decrease the level of light incident upon the cinecamera 6. Also, the diaphragm 4i is used as a shutter for completely interrupting the light path to the cinecamera 6.

As an alternative, the optical diaphragm of the cinecamera 6 itself may be employed instead of the external diaphragm 4i if the cinecamera diaphragm can be made to be externally or automatically controllable.

A diaphragm 4g, positionable by motor 4n, is provided for the cinecamera 5. A diaphragm 4j positionable by a motor 4k is provided to adjust the level of light incident upon the television camera 7. The positions of the diaphragms 4g, 4j are changed in response to the moving in and out of the half-mirrors 4b and 4e to pass the optimum level of light to the cinecamera 5 and television camera 7, respectively.

In the above-mentioned optical system device 4, since the half-mirror 4b is a jump-up mirror, only a minimum space is required for the half-mirror 4b to move from the setting position S to the shunting position R. Also, with the jumping-up function, it is possible to retain the half-mirror 4e or the entire reflection mirror 4d in the setting position after the half-mirror 4b is moved to the shunting position. As an added means of minimizing the space required for the mirrors 4d, 4e, the cinecameras 5, 6 can be spaced from the half-mirror 4b in the setting position by equal distances especially where light is distributed to the cinecameras 5, 6 by the half-mirror 4b.

As a result, it is possible to equalize and to minimize the individual distances from the lens 4a to the cinecameras 5, 6 to maintain within useful limits the attenuation of the level of intensity of environmental light caused by lengthening the optical path of light transmitted through the lens 4a. Also, since the cinecameras 5, 6 are equidistantly spaced relative to the primary lens 4a, their optical conditions are virtually identical.

A small prism 41 for light distribution is disposed near the side portion of the optical field of the primary lens 4a on the emitting side thereof. The distributing direction of the prism 41 is parallel to the optical axis of the television camera 7. The television camera 7 is movable by a suitable mechanism (not shown) to be in alignment with the distributing optical path of the prism 41. A small diameter lens 4m is provided in the distributing optical path of the prism 41 and in front of the television camera 7.

In this construction, the television camera 7 need only include a conventional image forming mechanism. The television lenses 4m and 7a are used as the necessary optics to form the television image.

Referring again to FIG. 1, a mode setter 8 selectively sets the system into and out of various operating modes such as fluoroscopy, and stereoscopic or single source cinematography. A radiographic control device 9 is provided to drive each of the motors 4d, 4e, 4h, and 4k according to the output signals produced by the position detectors 4f and 4g so as to be in the proper positions to carry out the mode selected by the mode setter 8. The radiographic control device 9 also operates to control the drive of cinecameras 5 and 6 in the stereoscopic mode and the drive of only cinecamera 6 whenever the radiographic mode is selected and to produce shutter motion detecting outputs for the cinecameras 5 and 6.

An X-ray controller 10 generates the voltage and current settings for the X-ray tube 1 corresponding to fluoroscopic or radiographic operation of the system whenever the fluoroscopy or the radiography modes are selected by the mode setter 8. Furthermore, the X-ray controller 10 generates an X-ray exposure switching control output signal for the right cathode Kr of the X-ray tube 1 when the position detector 4f indicates that the half-mirror 4b is in the first or reflecting position and an X-ray exposure switching control output signal for the left cathode Kl of the X-ray tube 1 when the position detector 4g indicates that the half-mirror 4c is in the first or reflecting position.

An X-ray high voltage generator 11 issues high voltage pulses responsive to the voltage and current settings generated by the X-ray controller 10 to permit the X-ray tube 1 to generate radiation pulses. An X-ray tube switching controller 12 is coupled to the X-ray high voltage generator 11 and the X-ray controller 10. The X-ray switching controller controls the potential applied to the grids Gr and Gl and the cathodes Kr and Kl to perform on-off control of the X-ray beams generated by the X-ray tube 1.

Figure 3:
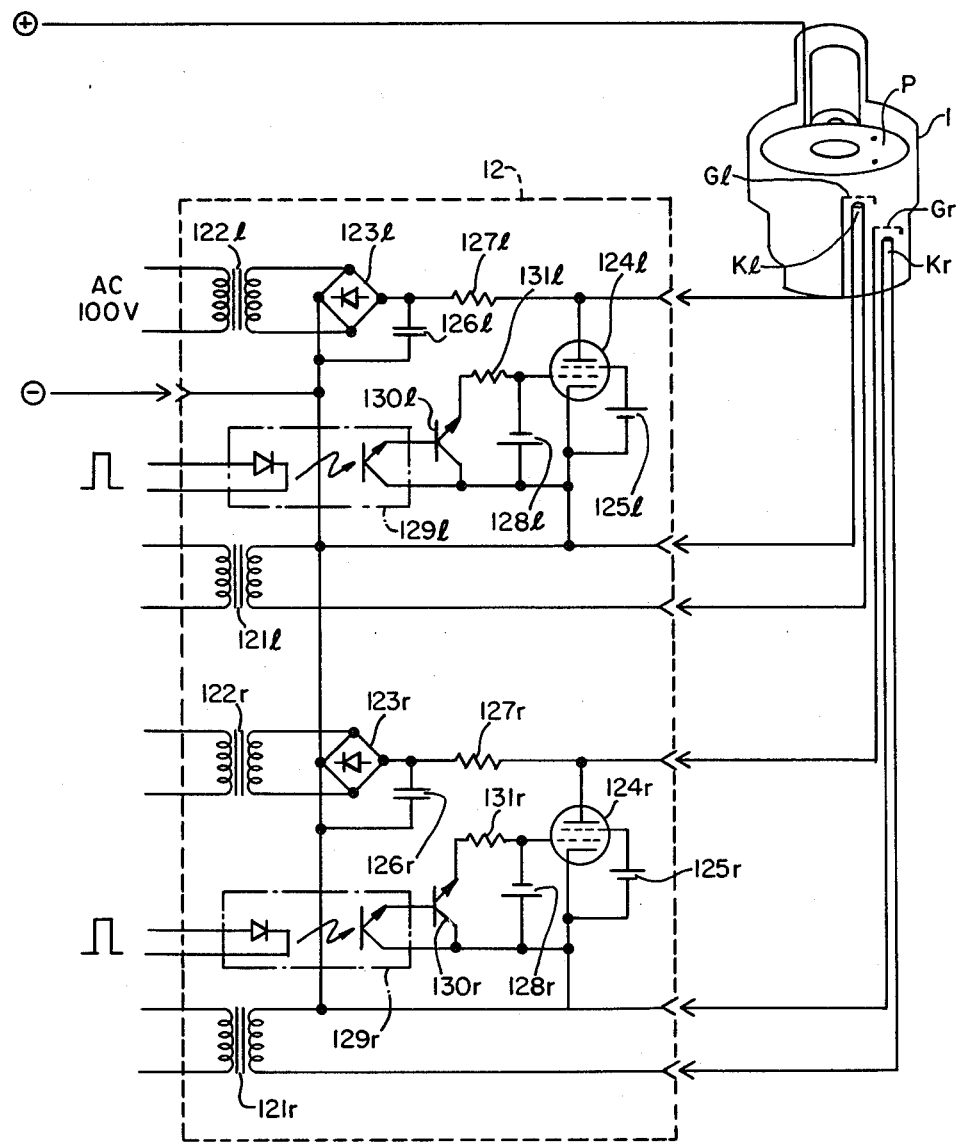
FIG. 3 is a detailed circuit diagram illustrating the X-ray tube switching controller of FIG. 1.

The X-ray tube switching controller 12 is shown in detail in FIG. 3 wherein the symbols + and − designate input terminals for receiving the positive and negative polarity high voltage pulses generated by the X-ray high voltage generator 11. The X-ray switching controller 12 includes two separate but similar control circuits singly associated wih the cathodes Kr and Kl utilized to generate the two focal spots fr and fl on the anode P of the X-ray tube 1. Since the two control circuits have the same construction, only one of the circuits will be explained in detail although both circuits are illustrated in FIG. 3. The elements included in the two circuits are readily identifiable by the r and l subscripts used in FIG. 3. For purposes of description and in view of the similar operation of the two circuits, the subscripts will be dropped in the following discussion of FIG. 3.

In FIG. 3, a filament heating transformer 121 receives the output of the X-ray high voltage generator 11 to generate the heating voltage to be applied to the cathodes Kl or Kr of the X-ray tube 1 to generate the heat electrons.

A transformer 122 for producing the grid potentials to control the electric gating grids Gl or Gr for the X-ray tube 1 is connected at one winding to a power supply source. The other winding is connected across a rectifying circuit 123 which completely rectifies the output of th transformer 122 to obtain a dc voltage of negative polarity. A tetrode 124 for the exposure switching control of the X-ray tube 1 is connected to the output of the rectifier 123 and between the corresponding gating grid and cathode of the X-ray tube 1. A power supply source 125 for applying a second gating grid potential is connected between the cathode and a second grid of the tetrode 124 and applies to the second grid of the tetrode 124 a positive potential to bring the internal resistance of the tetrode to an optimum value. A condenser 126 is connected between the output terminals of the rectifying circuit 123. A resistor 127 is connected between the rectifying circuit 123 and the corresponding grid of the X-ray tube 1. A potential source 128 is connected between the cathode and the first grid of the tetrode 124 to bias the first grid to a negative value.

A photocoupler 129 is provided and is activated by accepting the X-ray exposure control switching output signal from the X-ray controller 10. A switching transistor 130 is activated by the output of the photocoupler 129. The transistor 130 is connected at its emitter to the negative terminal of the potential source 128 through a resistor 131 and at its collector to the positive terminal of the potential source 128.

In the operation of the X-ray switching controller 12, the high voltage output signal from the X-ray high voltage generator 11 is applied between the anode and cathode of the X-ray tube 1 and is applied to the cathode, for example Kl, through the filament heating transformer 121 to produce a filament heating voltage. The output of the transformer 122 is rectified by the rectifying circuit 123 and applied as a negative potential to the corresponding grid of the X-ray tube 1 through the resistance 127. Thus, an inverse bias is provided between the corresponding grid and the cathode associated therewith of the X-ray tube 1 by the output voltage of the rectifying circuit 123 so that the X-ray tube 1 is held in a cut-off state. The output voltage of the rectifying circuit 123 is also supplied to the tetrode 124 to bias the tetrode 124 inversely into a normal cut-off state.

When the X-ray exposure switching control output signal of the X-ray controller 10 is applied to the photocoupler 129, the transistor 130 is switched on by the output of the photocoupler 129. Accordingly, a closed circuit is formed including the bias potential source 128, transistor 130, and resistance 131 to cause a voltage drop across the resistance 131 so that the inverse bias applied to the first grid of the tetrode 124 is removed. The tetrode 124 is thereby switched to the on state. Since current flows in a closed circuit including the resistance 127 and the tetrode 124, a voltage drop occurs across the resistance 127 and the inverse bias applied to the grid of the X-ray tube 1 is removed. As a result, heat electrons are emitted from the cathode of the X-ray tube 1 corresponding to the grid. When the heat electrons strike the anode P, a focal point is defined and X-rays are emitted from the X-ray tube 1.

When the X-ray exposure switching control output signal is removed, the photocoupler 129 no longer conducts so that the transistor 130 is turned off. This causes the first grid of the tetrode 124 to be reverse biased again and the current flow through the tetrode 124 is cut-off. Therefore, a reverse bias is also applied to the grid of the X-ray tube 1 and the flow of heat electrons from the X-ray tube 1 is also cut-off. The emission of X-rays immediately ceases.

It is possible to control the X-ray emissions to be separately associated with the right and left eyes of a viewer by alternately causing the photocouplers 129r and 129l to be swtiched on or off by the X-ray exposure control switching output signal.

In the operation of the invention as illustrated in FIG. 1, the mode setter 8 is initially operated to select one of the stereoscopic cinematography, single cinematography, and fluoroscopic radiography modes.

When a stereoscopic cinematography mode starting instruction is supplied to the radiographic control device 9, the device 9 sends a stereoscopic cinematography mode control instruction to the controller 9a. The controller 9a controls the movement of the entire reflection mirror 4d and the half-mirror 4e into their shunting positions, the half-mirror 4b into the setting position S, and the television camera 7 into alignment with the optical path of the prism 41, respectively. Consequently, the half-mirror 4b in the optical system device 4 is inserted into the setting position S in the optical field of the primary lens 4a. Light transmitted through the primary lens 4a is incident upon the cinecameras 5, 6, and a portion of the light from the primary lens 4a is captured by the television camers 7 positioned in the distributing optical path of the prism 41.

The radiographic control device 9 delivers a driving output to each of the motors 4h, 4k, and 4n to adjust each of the optical diaphragms 4i, 4j, and 4g, respectively, to the proper opening corresponding to the level of incident light. In this case, since the degree of opening of the optical diaphragms 4g, 4i, and 4j were previously known they are automatically adjusted to the proper values according to the selected mode of operation and the transmission rates of the optical devices. The optical diaphragms 4g, 4i, and 4j are also used as optical shutters. For example, the optical diaphragm 4g of the cinecamera 5 may have a fixed opening rate or be responsive to a manual diaphragm setting because the cinecamera 5 is used only in the stereoscopie cinematography mode.

The above actions result in the optical system device 4 being set in a state capable of performing stereoscopic cinematography.

Subsequently, the radiographic control device 9 sets the X-ray controller 10 to the required tube voltage and current setting for the radiographic condition. When a radiography start command is applied to the radiographic control device 9, the device 9 delivers signals to the cinecameras 5, 6, respectively, initiating the driving of film within the cinecameras.

Figure 4:
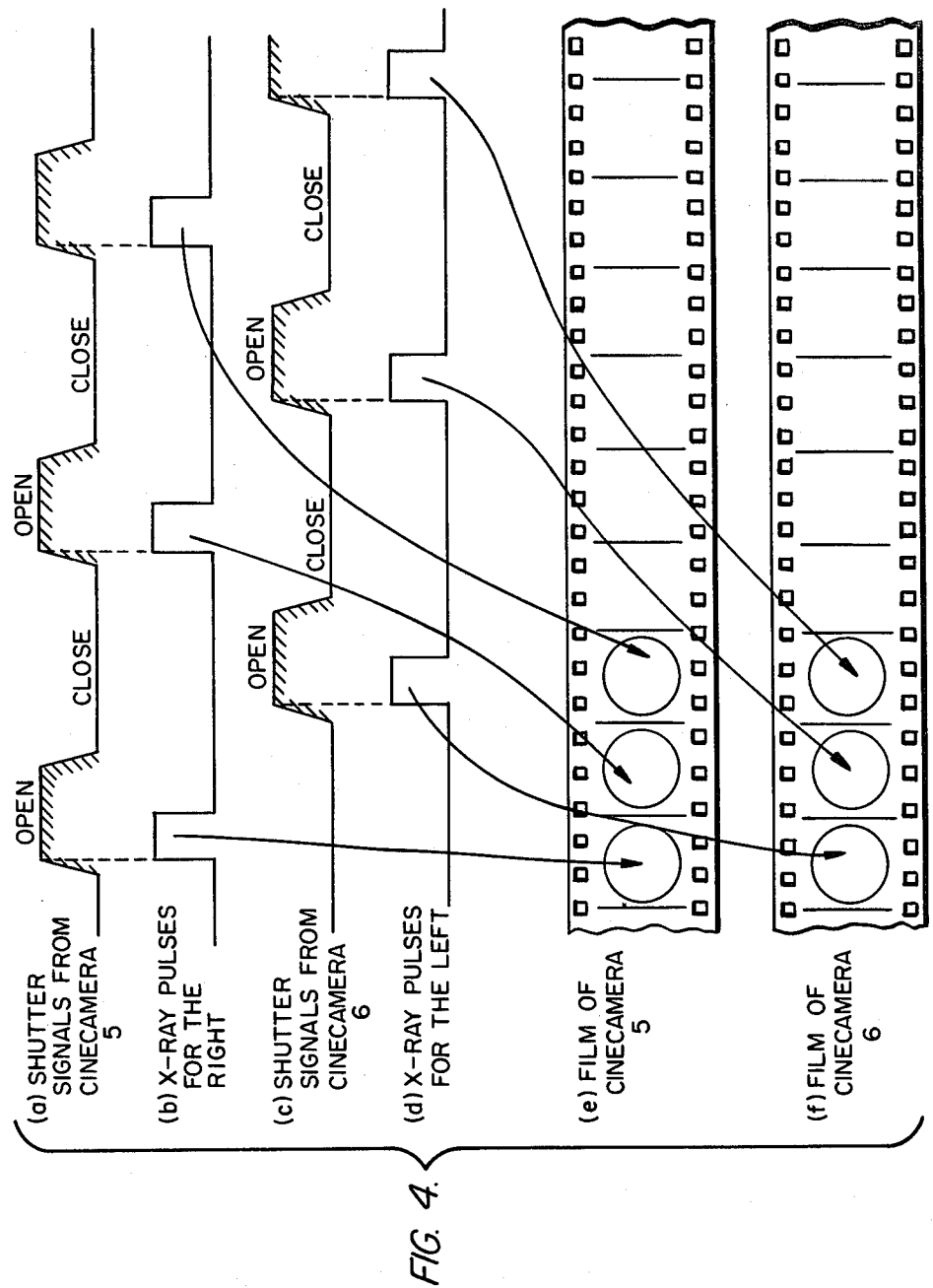
FIGS. 4(a) to (f) are timing diagrams for explaining the operational sequence of the invention.

As stated above, the shutters of the cinecameras 5, 6 are out of phase with each other by 180° and, as shown in FIGS. 4(a) and (c), do not permit the superimposition of shutter open conditions in th stereoscopic radiography mode. Therefore, when the shutter of the cinecamera 5 is open the shutter of the cinecamera 6 is closed. Each time the shutter of cinecamera 5 is open, the previously described shutter position signal is generated and the radiographic control device 9 generates an X-ray exposure switching control output responsive to the shutter position signal.

When the stereoscopy mode is selected, the cinecamera 5 is used for the right side and the cinecamera 6 for the left side. The radiographic control device 9 applies the X-ray exposure switching control output to the X-ray controller 10 as an X-ray exposure switching control output for the right after receiving the shutter position detector signal from the cinecamera 5. The X-ray controller 10 applies the X-ray exposure switching control output to the photocoupler 129r in the control circuit for the X-ray tube switching controller 12.

As a result, the tetrode 124r is switched on as previously described so that heat electrons are emitted toward the anode P from the cathode Kr of the X-ray tube 1 in accordance with the output from the X-ray high voltage generator 11.

The resultant X-rays are emitted from the focal point fr in the sequence shown in FIG. 4(b). The X-ray image resulting from the X-rays passing through the object 2 under study is supplied to the input of the image intensifier 3 which faces the X-ray tube 1. The intensifier 3 converts the X-ray image to a corresponding optical image which is supplied to the optical system device 4. Approximately 50% of the intensity of the optical image incident upon the optical system 4 is distributed to the cinecamera 5 by the half-mirror 4b to permit the right side image of the object 2 to be photographed by the cinecamera 5 during the shutter times shown in FIG. 4(e). Meanwhile, although much of the remaining 50% of the image intensity is reflected to the cinecamera 6, no photograph is taken because the shutter of cinecamera 6 is closed.

A very small amount of the light of the optical image is not reflected by the half-mirror 4b but is reflected onto the small television lens 4m by the prism 41. Since, in this event, the television camera 7 has been moved into the optical field of the lens 4m, the incident light is delivered to the television camera 7 and an image is displayed on a television monitor (not shown). In this case, although both the prism 41 and the television lens 4m are small, observable images are obtained because the X-ray intensity in the radiographic condition is hundreds of times more intense than images produced in the fluoroscopic condition.

Subsequently, the shutter in the cinecamera 5 rotates to the closed position and the shutter of the cinecamera 6 rotates to the open position as shown in FIG. 4(c). The shutter position detector of the cinecamera 6 generates a shutter position signal and supplies it to the radiographic control device 9 when the shutter of cinecamera 6 is open. As a result, the radiographic control device 9 issues an X-ray exposure light amount through the prism 41 for display on a television monitor (not shown).

As described above, optical images corresponding to the X-rays for the focal spot fr are emitted from the X-ray tube 1 when the shutter of the cinecamera 5 is open and the resultant image for the right is photographed in the cinecamera 5. Similarly, the optical image corresponding to the X-rays for the focal spot fl are photographed by the cinecamera 6 during the times the shutter of the cinecameras 6 is open. This operational sequence is repeated until a radiographic stop instruction is issued.

To initiate the single cinematography mode, a single cinematography instruction is supplied to the controller 9a from the radiographic control device 9. The controller 9a controls the positioning of (1) the half-mirror 4b into the shunting position R, (2) the entire reflection mirror 4d into the setting position ST, and (3) the half-mirror 4e into the optical field of the primary lens 4a in front of the entire reflection mirror 4d. Furthermore, the controller 9a causes the television camera 7 to be moved into the optical field of the television lens 7a.

Driving outputs from the radiographic control device 9 are simultaneously applied to the motors 4h, 4k to adjust the optical diaphragms 4i, 4j to preset diaphragm opening valves corresponding to the light distribution value due to the positioning of the half-mirror 4e. Since the cinecamera 5 is unused in the single cinematography mode, the optical diaphragm 4g is shut to intercept all light incident thereon.

The half-mirror 4e is moved into the optical field of the lens 4a by the mirror unit 4e' and, in the single cinematography mode, the half-mirror 4e is adjusted in rotational position by the motor 4f to reflect light incident thereon to the cinecamera 6. Such control is performed by the controller 9a. Thus, the half-mirror 4e in the mirror unit 4e' is constructed such that the optical axis of half-mirror 4e in the interposing position coincides with the optical path of the lens 4a and can be rotated by the motor 4f. Therefore, in the single cinematography mode an optical image produced by image intensifier 3 is reflected to the cinecamera 6 by setting the reflection optical axis of the mirror 4e to coincide with the optical axis of the cinecamera 6. The radiographic control device 9 supplies the necessary driving output signal to the cinecamera 6 to drive cinecamera 6 and also controls the electrical conductivity of the grid Gr of the X-ray tube 1 as previously described to synchronize it to the opening of the cinecamera 6.

In the single cinematography mode, the intensity of the optical image corresponding to the X-ray image is distributed by half-mirror 4e so that 90% is reflected by a front side of the half-mirror 4e to the cinecamera 6. The remaining 10% of the image intensity is transmitted through the half-mirror 4e and is reflected in its entirety by the entire reflection mirror 4d back toward the half-mirror 4e since the entire reflection mirror 4d is interposed in the path of the attenuated optical image transmitted through mirror 4e. The result is that 90% of the light reflected by the mirror 4d is distributed by the back side of the half-mirror 4e to the television camera 7 for display on a monitor (not shown) as a fluoroscopic image. In this case, no light is admitted into the cinecamera 5 because of the position of the entire reflection mirror 4d.

To initiate the fluoroscopy mode, a control instruction for the fluoroscopy mode is issued to the conroller 9a from the radiographic control device 9. As a result, the motor 4f is driven so that the reflecting direction of the half-mirror 4e in the mirror unit 4e' coincides with the optical exis of the television lens 7a. The half-mirror 4e is rotated around the optical axis of the primary lens 4a so that its reflecting direction is set to coincide with the optical axis of the lens 7a. The radiographic control device 9 simultaneously applies a driving output to the motor 4k so that the optical diaphragm 4j of the television lens 7a is opened to establish an optimum exposure corresponding to the full amount of light intensity incident thereon.

The radiographic control device 9 controls the X-ray controller 10 to output the proper tube current and voltage settings in the fluoroscopic condition and the X-ray controller 10 sets the X-ray high voltage generator 11 into the fluoroscopy condition. A signal for removing the inverse bias on either the left or the right grid of the X-ray tube 1 is delivered to the X-ray tube switching controller 12 through the X-ray controller 10 to perform X-ray exposure. The resultant X-ray image of the object 2 under study is converted to an optical image by the intensifier 3 and directed to the television camera 7 for display on a television monitor (not shown).

Figure 5:
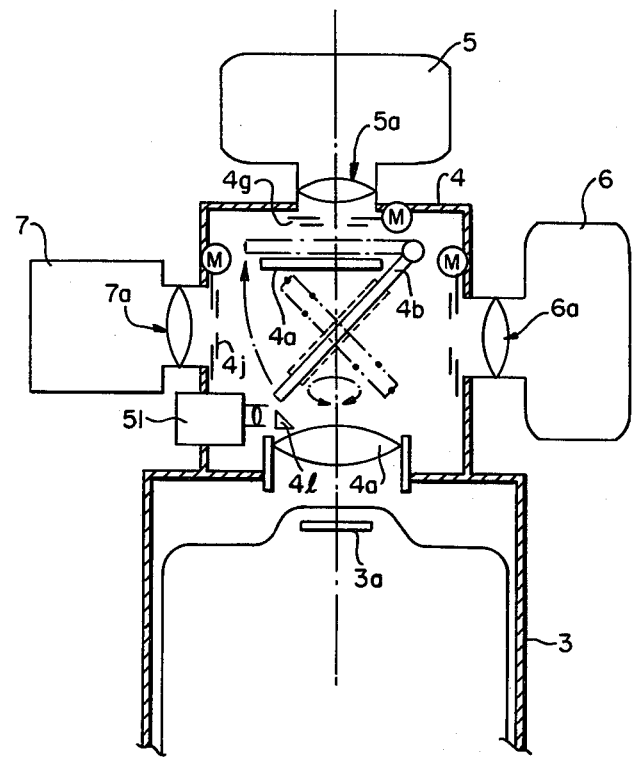
FIG. 5 is a sectional view of a modification of the optical system device of FIGS. 2(a) and 2(b)

In the above-described construction, the television camera 7 is fabricated such that the televisian lenses 7a and 4m are disposed at desired positions, and the imaging part is moved to be positioned in the optical path of the lens 7a or 4m to perform television fluoroscopy. As shown in FIG. 5, an alternate embodiment comprises a fixed television camera 7 with a television lens 7a. The television camera 7 is positioned such that the optical axis thereof coincides with the optical axis of the cinecamera 6. A small-sized television camera 51, using, for example, a charge coupled device (CCD), may be fixedly positioned with its optical axis in line with the distributing optical path of the prism 41 so that the output of the television camera 51 is displayed as an an image on a television monitor (not shown). Although a television camera using a CCD is lower in resolution, it can be miniaturized so as not to require an expansive positioning space and to result in a simpler and smaller device than a shifting television camera as shown in FIG. 2(a). In the cintematography mode, television fluoroscopy is performed from the images photographed by the cinecameras 5, 6 making high resolution unnecessary as required in the fluoroscopy mode. Also, the prism 41 has a sufficiently small configuration and is disposed in a corner of the optical field of the lens 4a so as not to cast shadows that would appear on the film of the cinecameras.

With the present invention constructed as described above, in the stereoscopic cinematography mode, X-rays for the right and left images are alternately emitted from an X-ray tube in response to the shutter operations of cinecameras 5, 6 so that the right image can be photographed by one of the cinecameras, for example, cinecamera 5, and the left image can be photographed by the other cinecamera, for example, cinecamera 6. The resulting right and left photographing enables stereoviewing. Since the instant invention is constructed to distribute approximately one half of the light intensity of an optical image to each of the two cinecameras 5, 6 through the first half-mirror 4b and the mirror 4d, the optical path length is shortened more than when two half-mirrors are employed. This design makes it possible to suppress to a minimum the degree of light attentuation caused by transmission through a pair of half-mirrors and the lens 4a. When attenuation is reduced it is no longer necessary to use a large bright lens as the primary lens to suppress to a minimum the light reduction therein.

Except during the stereoscopic cinematography mode, after the shunting of the first half-mirror the apparatus is constructed to interpose the second half-mirror 4e and the entire reflection mirror 4d to reflect the light transmitted through the second half-mirror 4e. Therefore, the reflection system of the present invention requires space within the optical path of the lens 4a for only the first half-mirror 4b. As a result, the image density rates of the two cinecameras 5, 6 are uniform since the attenuation rates of the peripheral light amount of the cinecameras 5, 6 are substantially equalized and the distances of the lenses 5a, 6a of the cinecameras 5, 6 to the primary lens 4a are equalized to perform precise stereoscopic recording. In addition, it is possible to perform either single cinematography or fluoroscopy means of mode setting and also to perform television fluoroscopy in the cinematography mode.

Figure 6B:
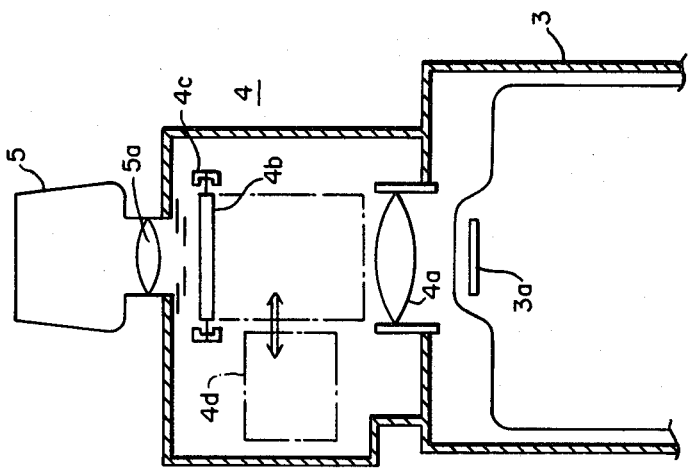
FIG. 6(b) is a sectional view of the device of FIG. 6(a) taken along the lines B—B.
Figure 6A:
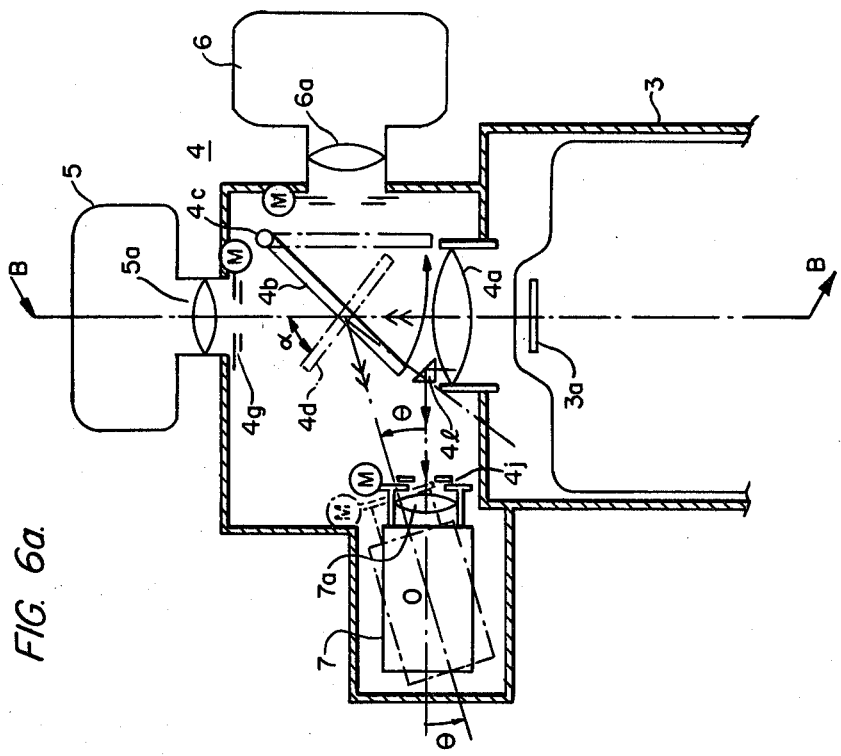
FIG. 6(a) is a sectional view of another modification of the optical system device of the instant invention.

Although each of the above-described embodiments include two half-mirrors it is possible that the cinematography mode may be performed by displaying images distributed by the prism 41. Such embodiment is illustrated in FIGS. 6(a) and 6(b) wherein the same components as in FIGS. 2(a), 2(b), and 5 are identified by the same reference marks and numerals in FIGS. 6(a) and 6(b).

In this embodiment, the 90% reflection-10% transmission half-mirror 4e included in the constructions of FIGS. 2(a), 2(b) and 5 is eliminated, and only the 50% reflection-50% transmission half-mirror 4b and the entire reflection mirror 4d are utilized.

The half-mirror 4b is a jump-up mirror as previously described and is mounted on the hinge 4c. However, the jumping-up direction is altered from being in the direction of the optical axis of the lens 5a to being in the direction of the optical axis of the lens 6a of the cinecamera 6. As a result, the half-mirror 4b is positioned at a declining angle of 45° with regard to the optical axis of the primary lens 4a when it is desired to distribute the output image from the image intensifier 3 to the two cinecameras 5, 6 so that the reflection light (about 50% of the intensity) is distributed to the cinecamera 6 and the transmission light (about 50% of the image intensity) is transmitted to the cinecamera 5. The cinecamera 5 is aligned with the optical axis of the primary lens 4a.

In the singe cinematography mode, the half-mirror 4b is rotated around the hinge mounting 4c to move out from the optical field of the primary lens 4a and to approach a parallel relationship with the lens 6a of the cinecamera 6, i.e., the half-mirror 4b is shunted from the optical path of lens 4a. As a result, since there is nothing disposed in the optical path of the primary lens 4a, the output image from the intensifier 3 is directly transmitted to the cinecamera 5 and is not distributed to the cinecamera 6. In the embodiment of FIGS. 6(a) and 6(b), only the cinecamera 5 is used in the single cinematography mode and the intensity of the light incident thereon is twice as great as compared to operation in the stereoscopic cinematography mode. Therefore, the optical diaphragm 4g of the cinecamera 5 is constructed with an automatic electric diaphragm so that the degree of opening can be controlled by the controller 9a so as to admit the optimum light amount to the cinecamera 5.

In order to provide television supervision in the cinematography mode, the small prism 41 is positioned within the optical field of the primary lens 4a. The television camera 7 is disposed in the optical field of the prism 41. The television camera 7 is mounted on a pivot 0 to translate an angle θ under the control of the controller 9a in the mode setting time. Thus, in the cinematography mode, the television camera 7 is positioned in coincidence with the distributing optical field of the prism 41 and television fluoroscopy is performed even in the cinematography mode.

In the fluoroscopy mode, the entire reflection mirror 4d is in the optical field of the emitting side of the primary lens 4a. The entire intensity of the output image of the intensifier 3 is reflected by the entire reflection mirror 4d toward the television camera 7. (See FIG. 6(a))

Since the direction of the optical field reflected by the entire reflection mirror 4d is not aligned with the distributing optical field of the prism 41, the television camera 7 is angularly pivoted to align the optical axis thereof with the optical axis of the optical image reflected by the entire reflection mirror 4d. In this case, because the intensity of the optical image reflected by the entire reflection mirror 4d is greater than the intensity of an image distributed by the prism 41, the optical diaphragm 4j positioned in front of the television camera 7 is adjusted to admit the optimum light amount to the television camera 7.

The above-mentioned operation is performed by the controller 9a at mode setting time so that television fluoroscopy can be performed with precise resolution and the proper light amount.

It will be apparent, to those skilled in the art, that modifications and variations can be made in the embodiments disclosed herein without departing from the scope or the spirit of the invention. For example, the optical diaphragm of the cinecameras or the television camera can be eliminated and replaced by an N.D. filter, liquid crystal filter, shutter, or the like to perform the light adjusting function. Thus, it is intended that those modifications and variations which come within the scope of the appended claims and their equivalents be included in the present invention.

What is claimed is:

1. An X-ray stereoscopic cinematography apparatus for selectively producing images of an object in a stereoscopic cinematography mode, a single cinematography mode, and a fluoroscopy mode by means of first and second cinecameras, each of the cinecameras including a rotatable shutter and an associated shutter position detector generating shutter position signals, the shutter of the first cinecamera being out of phase with the shutter of the second cinecameras, the apparatus comprising:

an X-ray tube having at least a pair of focal spots from which X-rays are independently irradiated through the object to create an X-ray image thereof;

means for converting said X-ray image into a corresponding optical image and for transmitting said optical image along a predetermined optical path;

an optical system device for selectively distributing said optical image, said optical system device including a first half-mirror being positionable in a first position in the optical path of said optical image to transmit a portion of the intensity of said optical image to said first cinecamera and to reflect a portion of said optical image to said second cinecamera and in a second position removed from the light path of said optical image, a second half-mirror being positionable into a first position to reflect said optical image to said first cinecamera, a second position to reflect a portion of the intensity of said optical image to said second cinecamera, or a third position removed from the light path of said optical image, and an entire reflection mirror positionable in a first position in said optical path of said optical image to reflect said image and a second position removed from said optical path of said optical image;

a television camera for receiving the light intensity of said optical image and for converting said receiving optical image to corresponding electric signals;

a mode setter for selecting one of said stereoscopic cinematography mode, single cinematography mode, and said fluoroscopy mode;

a radiographic control device for controlling the positioning of said second half-mirror into and out of said first, second, and third positions and the positioning of said first half-mirror and said entire reflection mirror into said first or second position in accordance with said selected mode, for controlling the intensity of said optical images reflected to said second cinecamera and said television camera responsive to said positioning of said first and second half-mirrors and said entire reflecting mirror, for controlling photographing of said optical image by said first and second cinecameras, and for issuing X-ray exposure control switching signals synchronized to the positions of said shutters of said first and second cinecameras in accordance with said shutter position signals;

a controller responsive to said mode selected by said mode setter for controlling said radiographic control device to position (1) said first half-mirror in said first position, said second half-mirror into said third position, and said entire reflection mirror into said second position responsive to the selection of said stereoscopic cinematography mode, (2) said first half-mirror in said second position, said second half-mirror into said second position and said entire reflection mirror into said first position responsive to the selection of said single cinematography mode, and (3) said first half-mirror in said second position, said second half-mirror in said third position, and said entire reflection mirror into said first position in response to the selection of said fluoroscopy mode; and means for selectively performing on-off control of the X-rays irradiated from each of said focal spots of said X-ray tube responsive to said X-ray exposure control switching signals.

2. The X-ray stereoscopic cinematography apparatus of claim 1 further including:

reflection means in the path of said optical image for reflecting said optical image; and means for positioning said television camera in a first position to receive said optical image reflected by said second half-mirror in response to the selection of said single cinematography mode or said fluoroscopy mode and a second position in response to the selection of sid stereoscopic cinematography mode.

3. The X-ray stereoscopic cinematography apparatus of claim 1 further including:

reflection means in the path of said optical image for reflecting said optical image; and a second television camera fixedly positioned to receive said optical image reflected by said reflection means in response to the selection of said stereoscopic cinematography mode, said first television camera being fixedly positioned in a second position to receive said optical image reflected by said second half-mirror responsive to the selection of said fluoroscopy or said single cinematography mode.

4. An X-ray stereoscopic cinematography apparatus comprising:

an X-ray tube having at least a pair of focal spots from which X-rays are independently irradiated through an object to create an X-ray image thereof;

means for converting said X-ray image to a corresponding optical image and for transmitting sid optical image in an optical path;

an optical system device for selectively distributing said optical image, said optical system device including a half-mirror being positionable in a first position to reflect a portion of the intensity of said optical image and to transmit a portion of the intensity of said optical image and in a second position removed from the path of said optical image, an entire reflection mirror being positionable in an incident light position in said optical path of said optical image to reflect the entire intensity of said optical image in a first direction and a shunt position out of the path of said optical image, and reflector means positioned in said path of said optical image to reflect said optical image in a second direction;

a first cinecamera for photographing said optical image transmitted through said half-mirror of said optical system device;

a second cinecamera for photographing said optical image entering said optical system device or the optical image reflected in said first direction by said half-mirror;

a television camera for receiving said optical image reflected by said reflector or by said entire reflection mirror;

a mode setter for selecting one of a stereoscopic cinematography mode, a single cinematography mode, or a fluoroscopy mode;

a radiographic control device for controlling the positioning of said half-mirror and said entire reflection mirror into and out of said path of said optical image in accordance with said selected mode, for controlling the intensities of the images reflected to said second cinecamera and said television camera responsive to changes in the intensity of light thereupon as a result of the positioning of said half-mirror and said entire reflector mirror, for controlling the photographing of said optical image by said first and second cinecamera, and for issuing X-ray exposure control switching signals;

a controller for controlling said radiographic control device to position (1) said half-mirror in said first position in response to the selection of said stereoscopic cinematography mode, said half-mirror in said second position to permit said optical image to be directly delivered to said second cinecamera in response to the selection of said single cinematography mode, and said entire reflection mirror in the path of said optical image to reflect said optical image to said television camera in response to the selection of said fluoroscopy mode; and means for selectively performing on-off control of the X-rays irradiated from each of said focal spots of said X-ray tube responsive to said X-ray exposure control switching signals.

* * * * *

UNITED STATES PATENT AND TRADEMARK OFFICE
CERTIFICATE OF CORRECTION

PATENT NO. : 4,383,328
DATED : May 10, 1983
INVENTOR(S) : TETSUROU KURIHARA ET AL.

It is certified that error appears in the above—identified patent and that said Letters Patent is hereby corrected as shown below:

Claim 1, Col. 13, line 52, change "ing" to --ed--.

Claim 2, Col. 14, line 34, change "sid" to --said--.

Claim 4, Col. 14, line 54, change "sid" to --said--.

Signed and Sealed this

Sixth Day of September 1983

[SEAL]

Attest:

Attesting Officer

GERALD J. MOSSINGHOFF

Commissioner of Patents and Trademarks